(12) United States Patent
Hess et al.

(10) Patent No.: US 9,075,127 B2
(45) Date of Patent: Jul. 7, 2015

(54) HEAD TRACKING SYSTEM

(75) Inventors: Wolfgang Hess, Karlsbad (DE); Thorsten Mayer, Remchingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 954 days.

(21) Appl. No.: 13/226,991

(22) Filed: Sep. 7, 2011

(65) Prior Publication Data

US 2012/0057150 A1    Mar. 8, 2012

(30) Foreign Application Priority Data

Sep. 8, 2010 (EP) .................................... 10175803

(51) Int. Cl.
| | |
|---|---|
| *G01B 11/03* | (2006.01) |
| *G06F 3/12* | (2006.01) |
| *H04S 7/00* | (2006.01) |
| *G01S 5/16* | (2006.01) |
| *G01S 1/70* | (2006.01) |
| *G02B 27/00* | (2006.01) |
| *H04R 5/04* | (2006.01) |
| *G01S 3/784* | (2006.01) |
| *G06F 3/01* | (2006.01) |

(52) U.S. Cl.
CPC ................. *G01S 5/163* (2013.01); *G06F 3/012* (2013.01); *G01S 1/70* (2013.01); *G02B 27/0093* (2013.01); *H04R 5/04* (2013.01); *H04S 7/304* (2013.01); *G01S 3/784* (2013.01)

(58) Field of Classification Search
CPC ........ G01B 11/03; G01B 21/22; H04S 7/304; G06F 3/012
USPC .................................. 356/614, 615, 620, 622
See application file for complete search history.

(56) References Cited

U.S. PATENT DOCUMENTS

| | | | |
|---|---|---|---|
| 5,838,432 A | 11/1998 | Tokuhashi et al. | ........ 356/139.03 |
| 2009/0147993 A1 | 6/2009 | Hoffmann et al. | ............ 382/103 |

FOREIGN PATENT DOCUMENTS

| | | | |
|---|---|---|---|
| EP | 2 012 170 A1 | | 1/2009 |
| WO | PCT/US09/36575 | * | 9/2009 |

OTHER PUBLICATIONS

European Search Report, EP 10175803.5-1248, Feb. 21, 2011.

* cited by examiner

*Primary Examiner* — Rebecca C Bryant
(74) *Attorney, Agent, or Firm* — Brooks Kushman P.C.

(57) ABSTRACT

A head tracking system for determining a head position of a user may include a light source configured to emit light onto a rectangular position sensitive device supported by a support structure such as headphones. The light emitted by the light source may generate a light spot on the position sensitive device. A head position determining module may determine the head position using the position of the light spot on the position sensitive device. The support structure may be configured to support the position sensitive device such that a head rotation results in rotation of the position sensitive device and a displacement of the light spot toward a corner of the rectangular position sensitive device.

24 Claims, 9 Drawing Sheets

HEAD TRACKING SYSTEM

PRIORITY CLAIM

This application claims the benefit of priority from European Patent Application No. 10 175 803.5, filed Sep. 8, 2010, which is incorporated by reference.

BACKGROUND OF THE INVENTION

1. Technical Field

The present application relates to a head tracking system for determining a head position of a user and to a sound system for generating a virtual surround sound for the user using the head tracking system.

2. Related Art

Head tracking systems detect different types of movements of the head. By way of example, a head tracking system may detect a turning of the head around the longitudinal axis of the head, i.e. in a horizontal plane of the head.

SUMMARY

A head tracking system may determine the head position of a user. The system may include a light source emitting a light onto a planar rectangular position sensitive device provided in a support structure, the light emitted by the light source generating a light spot on the position sensitive device. A head position determining module may determine the head position based on the position of the light spot on the position sensitive device.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
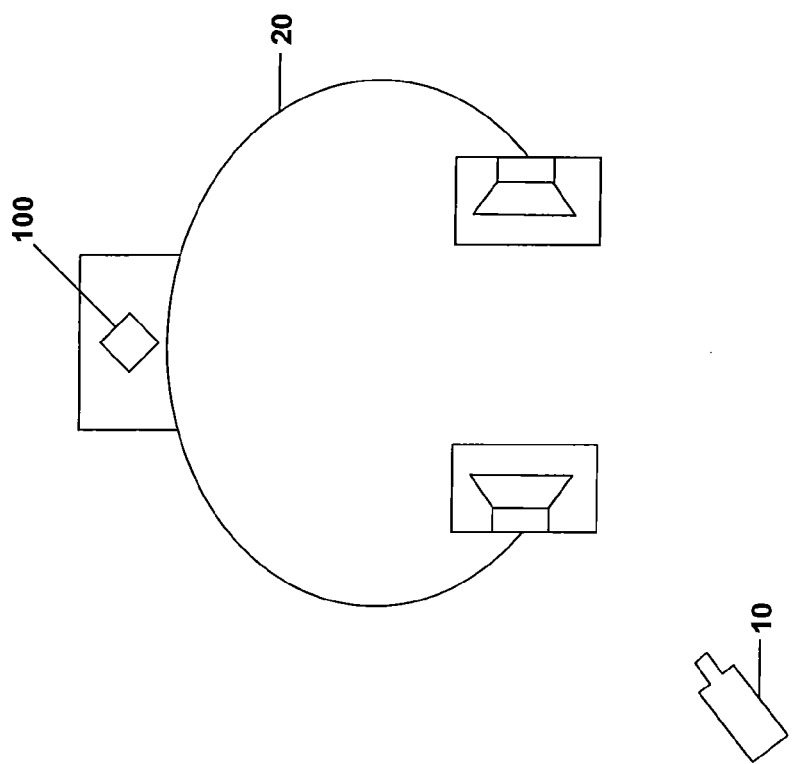
FIG. 1 shows a schematic view of a head tracking system generating a virtual surround sound for a user using the headphones.

A head tracking system may include a position sensitive device and a light source, such as a light emitting diode (LED) used for detecting the relative position of a human head. The system may be sufficient to detect relatively small head rotations of approximately +/−20°. The head position may be determined by the use of one single position sensitive device in a range sufficient to cover usual head movements of a user, e.g. in a vehicle.

In one example, the head tracking system may determine the head position of a user. The system may include a light source emitting a light onto a planar rectangular position sensitive device provided in a support structure. The light emitted by the light source may generate a light spot on the position sensitive device. A head position determining module may determine the head position based on the position of the light spot on the position sensitive device. The support structure may be designed to support the position sensitive device such that, in a head rest position where a surface normal of the planar rectangular position sensitive device points at the light source, a diagonal between a pair of opposing corners of the position sensitive device is oriented horizontally such that a head rotation in the horizontal plane results in a displacement of the light spot towards one corner of the rectangular position sensitive device. This orientation of the position sensitive device by the support structure may increase the range of head rotations or nodding movements of a head that can be detected.

In another example, the position sensitive device may be oriented such that a head rotation results in a displacement of a light spot to an edge of the position sensitive device. By turning the position sensitive device with an angle of 45° relative to such an orientation as described above, the detection range may be increased. The position of the light spot on the position sensitive device may provide a measure for the head rotation. As the distance between two opposite corners of a rectangular position sensitive device is larger than the distance between two edges of the rectangular position sensitive device, a larger range of head rotations can be detected. With the improved position of the position sensitive device, head rotations of around +/−45° relative to the straight forward looking position, i.e., the head rest position or reference position, can be detected.

The position sensitive device may be a square position sensitive device, the support structure supporting the square position sensitive device in such a way that a head rotation in the horizontal or vertical plane results in a displacement of a light spot on a diagonal of the square position sensitive device. For example, the support structure can support the position sensitive device on an apex of the position sensitive device. A diagonal of the position sensitive device may be oriented substantially horizontally. The light source may be arranged relative to the position sensitive device in such a way that when the user looks straight ahead, the light spot is located proximate the center of the square position sensitive device. This may define the head rest position where a surface normal of the planar rectangular position sensitive device points at the light source. For example, in the head rest position, the surface normal of the position sensitive device may be a vector perpendicular to the surface of the position sensitive device and having a direction pointing toward the light source. When the user rotates the head in one direction in the horizontal plane, the light spot is moved along the diagonal in one direction, whereas, when the user rotates the head in the other direction, the light spot moves on the diagonal in the other direction.

The head position determining module can be configured to determine a yaw angle of the head corresponding to a turning of the head in the horizontal plane, where the light source is positioned relative to the position sensitive device in such a way that the turning of the head results in a displacement of the light spot on one diagonal (e.g., a horizontal diagonal) of the position sensitive device. The position sensitive device then may determine the yaw angle from the position of the light spot relative to said one diagonal. Furthermore, in addition to the yaw angle, the position determining module can be further configured to determine the pitch angle of the head corresponding to a nodding movement of the head, where the light source is positioned relative to the position sensitive device in such a way that the nodding of the head results in a displacement of the light spot on the other diagonal (e.g., a vertical diagonal) of the position sensitive device, the position sensitive device determining the pitch angle from a position of the light source relative to said other diagonal. In this example the head positioning determining module may determine an angle describing the rotation of the head in the horizontal plane relative to the straight looking or relatively horizontal position of the head and additionally may determine an angle describing whether the user is looking up or down. In other words, the azimuth and the elevation angle of the head rotational angles may be determined.

Especially when the head tracking system is used in connection with a head-phone based sound system generating a virtual surround sound for a user, the determination of the azimuth angle, the yaw, may be the most important angle, as the change of the azimuth angle changes the interaural time differences and the interaural level differences which are the most prominent localization cues used by the human brain for localizing a sound source. Thus, the nodding movement, i.e. the elevation angle, is not necessarily determined, as it can be sufficient to only determine the azimuth angle.

A sound system may generate a virtual surround sound for a user using standard headphones. Alternatively, the system may be configured for use with any other type of loudspeaker or other sound generation device. The system may include a head tracking system as described above and a filter database containing a plurality of filter elements, each filter element corresponding to a defined head position. Furthermore, an audio signal processing module may be provided for receiving an audio input signal from an audio source such as a CD, a radio, a vehicle head unit, a wireless communication device, or any other source of a single or multi-channel audio content. The audio signal processing module also may generate the virtual surround sound for the headphones. The audio signal processing module receiving the determined head position may be configured to select the filter element of the determined head position and/or to filter the audio input signal with the selected filter element in order to generate the virtual surround sound for the user. The sound system can be used with any commercial available headphone. The headphone does not have to be a dedicated headphone, i.e. it needs only one loudspeaker per headphone side, but can also use more than one.

The system also may include a method for determining a head position of a user, which may include the steps of emitting by a light source light onto a rectangular position sensitive device provided in a support structure, the light emitted by the light source generating a light spot on the position sensitive device. The position sensitive device may be arranged on a support structure such as headphones in such a way that a head rotation results in a displacement of the light spot to a corner of the rectangular position sensitive device. The position of the light spot on the position sensitive device may be used to determine the head position.

The position sensitive device can be a square position sensitive device that is supported by the support structure in such a way that the head rotation results in a displacement of a light spot on the diagonal of the square position sensitive device.

In FIG. 1 a head tracking system is schematically shown. The head tracking system includes one or more light sources 10 emitting light to one or more position sensitive devices 100 installed on headphones 20. The light source 10 can be a light emitting diode (LED) emitting light in a predetermined frequency range, e.g. infrared light in a pulsed way. In other examples, other sources of light such as sunlight, incandescent lamps, fluorescent lamps, high intensity discharge lamps, gas discharge lamps, lasers, or any other light sources are possible. The infrared frequency range may be used in order not to disturb a user wearing the headphones 20. As will be explained with reference to FIGS. 2-4 in further detail below, the light emitted by the LED 10 may generate a light spot on the position sensitive device 100. The position of the light spot on the position sensitive device may be used to determine the head position of the user wearing the headphones. The LED 10 may be arranged at a fixed location and may transmit the light in the direction of the user wearing the headphones. The system shown in FIG. 1 may be part of a rear seat vehicle entertainment system in which a user sitting on the back seat of a vehicle hears music or watches a film, the audio signals of which are emitted as audible sound using the headphones 20. With the present disclosure it is possible to generate a virtual surround sound for the user wearing the headphones as will be explained with reference to FIG. 5.

Figure 5:
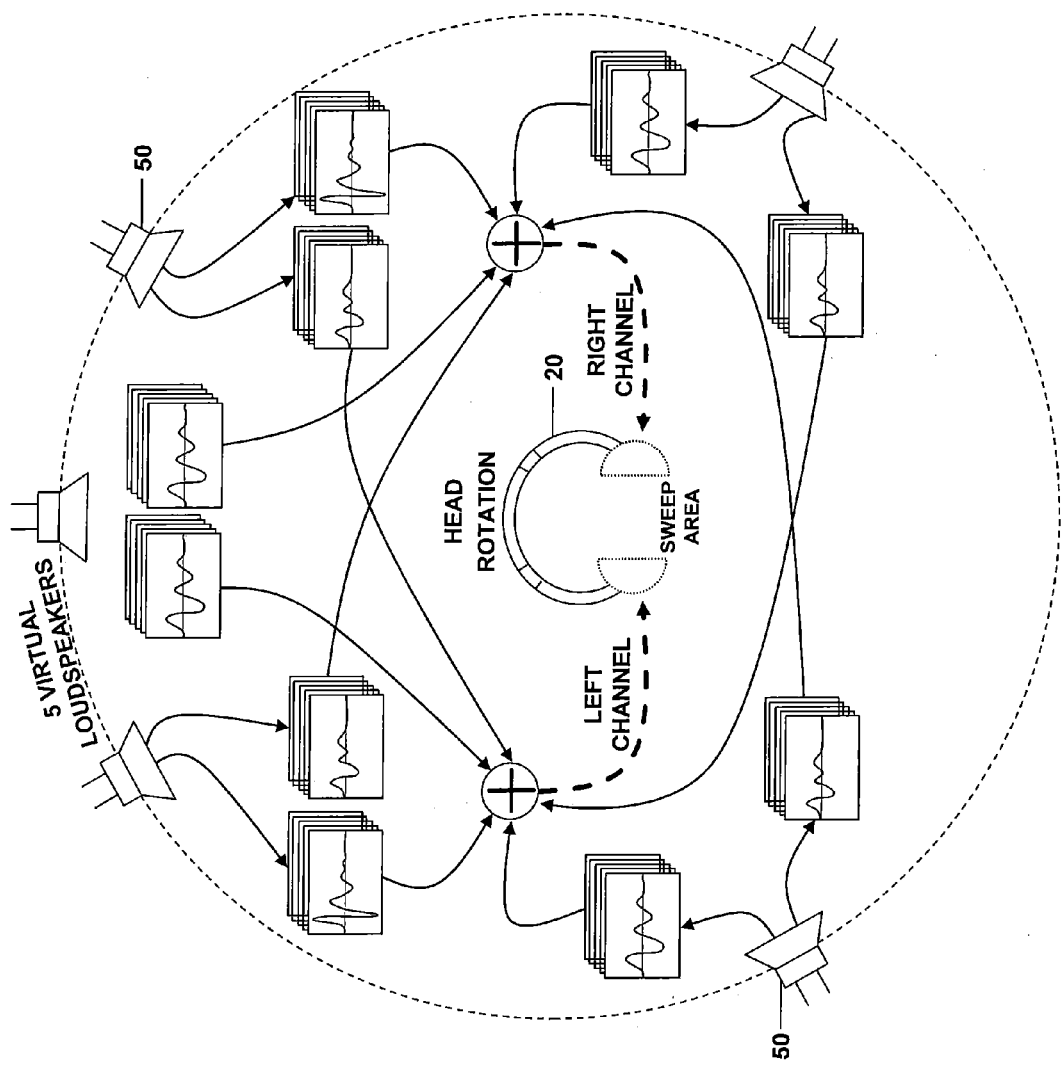
FIG. 5 shows a schematic view explaining an example of the generation of a virtual surround sound using headphones.

Determination of the head position may enable the generation of a virtual surround sound. In a virtual surround sound using headphones, a listening impression may be generated as if the user used a 5.1 or 7.1 loudspeaker sound system as shown in FIG. 5, showing a system of 5 loudspeakers 50. The virtual surround sound field may give the impression as if the sound source is stable localized in the virtual room. This phenomena, known as acoustical room-constancy, allows the user using headphones to determine the stable direction from where the sound is coming. Also the user experiences an interactive listening process with the system when turning the head, corresponding to the real-world situation, since it is possible to localize the sound source stable outside of the head with correct front/back position.

Perfect externalized, realistic localization may become possible listening through standard headphones 20. This may be caused by tracking the position of the head and by determining a filter for the determined head position which are used for a low-latency blockwise convolution of the sound signal with the filter in real time.

Figure 6:
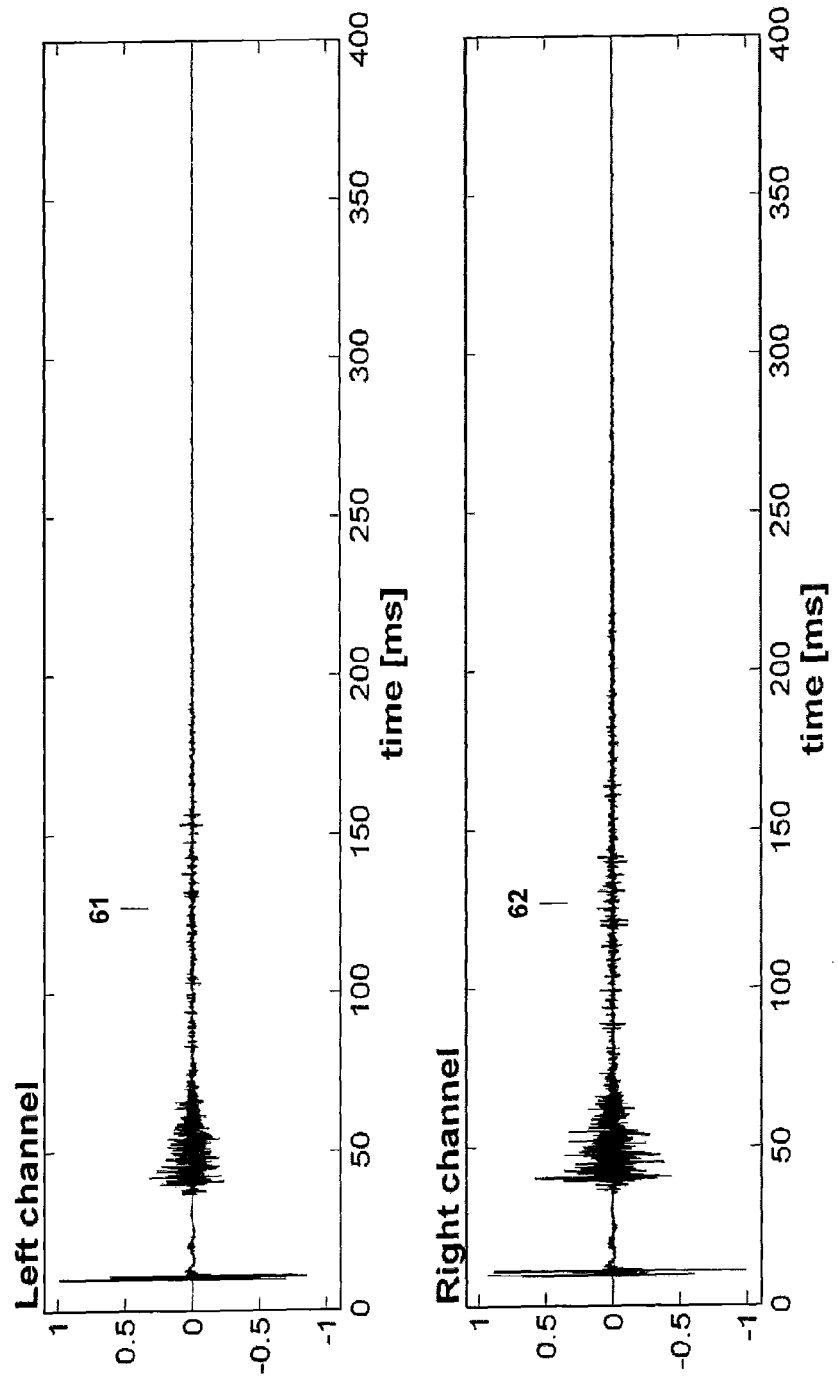
FIG. 6 shows exemplary audio signals of a left and right channel recorded for the generation of filter elements used to generate a virtual surround sound.

These filter elements can be generated in the following way: using a dummy head with microphones in each ear, the binaural room impulse responses may be measured. To this end the dummy head placed on a manikin or a stand is positioned in the location, e.g. in the vehicle where the system should be used. Different positions of the dummy head, e.g. different rotations, are used and, for each head position, the loudspeakers 50 as shown in FIG. 5, output a sound that is detected by the microphones in the dummy head. This may be repeated for different head rotations, e.g. in steps of 1°, until the azimuth angle of +/−45° is measured. In FIG. 6 the impulse response as measured in the two ears of the dummy head for a defined head position are shown, signal 61 showing the impulse response for the left channel/left ear, signal 62 showing the impulse response for the right channel/right ear. The signals shown in FIG. 6 describe the signals output from one of the loudspeakers of FIG. 5 to the left and the right ear of the dummy head. The audio signals are detected for each of the loudspeakers 50 and for the different head positions generating a plurality of impulse responses. Based on the impulse responses, at least one filter element is determined for each head position. When a stereo sound signal is then filtered using a filter for a determined head position by determining a real-time convolution of the audio signal with the filter element, the virtual surround sound can be obtained in which the user using head phones has the impression as if the audio signals came from a sound system as shown in FIG. 5.

The head tracking system that is used to generate the virtual surround sound using the headphones will now be explained in more detail with reference to FIGS. 2-4 and 7-8.

Figure 2:
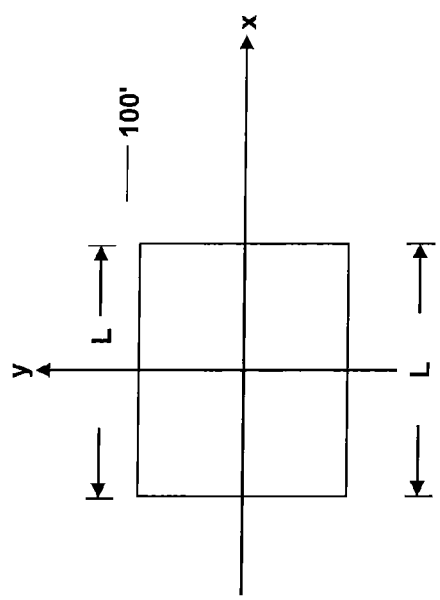
FIG. 2 shows an example of a position sensitive device arranged in one exemplary arrangement.

In FIG. 2 a position sensitive device 100' in one exemplary orientation is shown. Light emitted by a light source, such as the LED 10, may be focused on the position sensitive device 100' using a lens (not shown). The position sensitive device which is positioned in the focal plane of the lens receives the light emitted by the light source and a light spot is generated on the position sensitive device. The light source 10 may be positioned in such a way that when the user looks straight ahead, the light spot is located somewhere on the x-y-axis shown in FIG. 2. This may correspond to a head rest position where a surface normal of the planar rectangular position sensitive device points at the light source. An implementation of the position sensitive device 100' will be explained in more detail with reference to FIG. 7.

Figure 7:
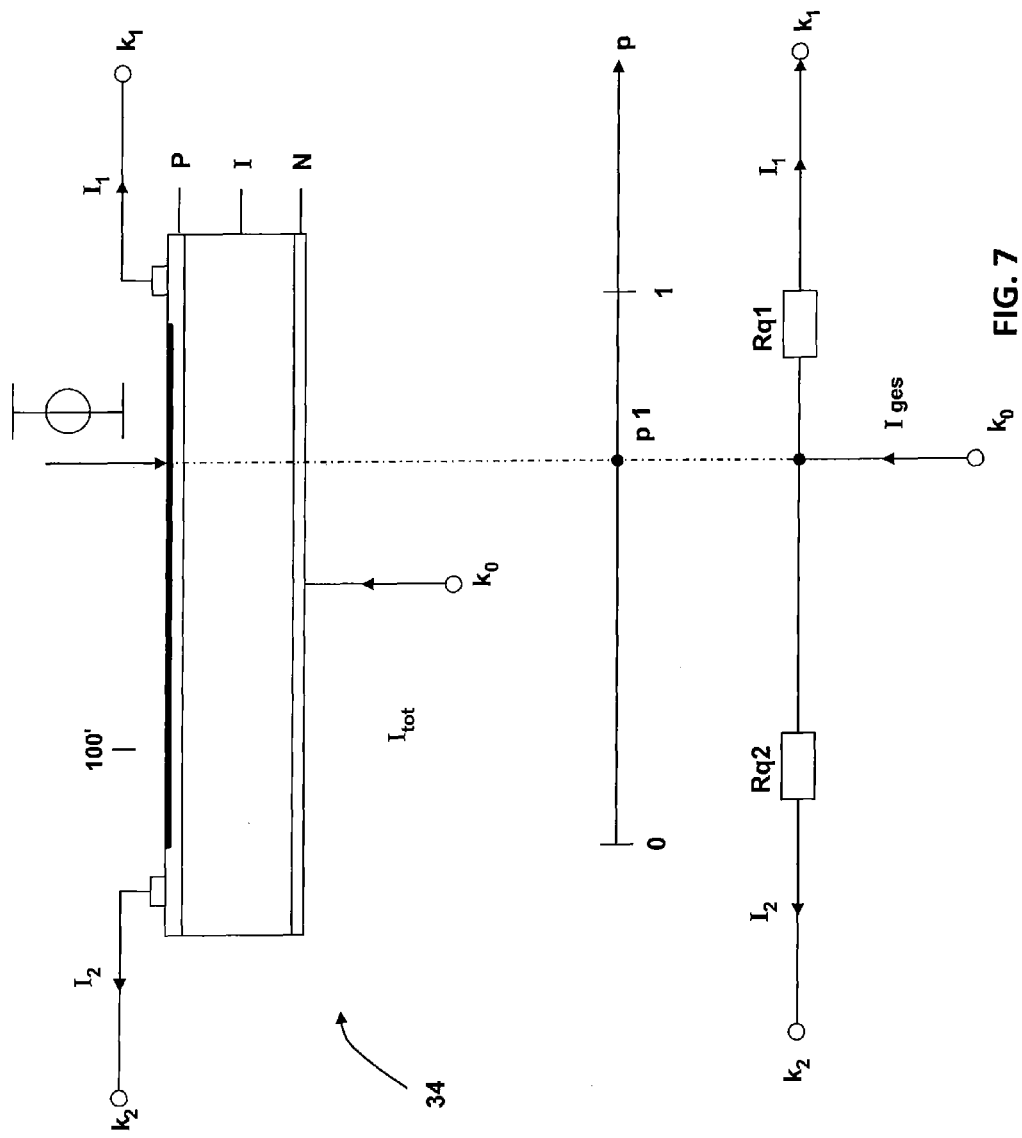
FIG. 7 is a diagram explaining the functioning of an exemplary position sensitive device.

In the upper part of FIG. 7 a cross sectional view of the position sensitive device is shown. The device 100' may include an extending pin structure, P indicating a P-doped semiconductor layer, I designating a nominally undoped or low-doped (insulating) semiconductor layer and N designating an N-doped semi-conductor layer. A back contact k0 may be coupled with the N-doped layer of the structure approximately in a middle of the N-doped layer. Opposing side contacts k1 and k2 may contact the P-doped layer. In order to provide a two-dimensional sensing, additional contacts (not shown) may be provided in a direction perpendicular to the contacts shown.

Such a device may use the so-called lateral photo effect for position sensing. A total current is supplied via contact k0. An arrow labeled Φ indicates a position where light falls on the sensor. At the area where light falls on the sensor, the device becomes conducting in a transverse direction (e.g., an up-down-direction in FIG. 7). In the p-axis in the middle of FIG. 7, this location is designated P1.

Assuming that the resistance of the N-doped layer is low, the resistance from k0 to k1 and k2 (Rq1 and Rq2, respectively, as shown in the lower part of FIG. 7) are determined by the position P1 where light falls on the sensor. Currents I1, I2 detected at k1, k2, respectively, are indicative of the position P1. In particular, in the dimension shown, the position P1 relative to the middle of the sensor is proportional to (I1−I2)/(I1+I2).

Similar considerations hold true for the two-dimensional sensor. With the above described position sensitive device, the above given ratio of currents may be independent of the light intensity received by the sensor, such that the distance from the light source to the position sensitive device does not influence the result.

Referring back to FIG. 2, this means that a light spot in the active area of the sensor having a length L may describe the head rotation alone (in a one-dimensional case) or the head rotation and the "nodding position" of the head in case of a two dimensional sensor. However, in the example of FIG. 2 the position of the light spot may be limited to +/−L/2 in the x and y direction. This limitation may result from the fact that, if the distance between the position P1 of the light spot and the middle of the sensor is greater than L/2 in either direction, the light spot may be positioned off of the sensor (i.e., the light spot may not contact the sensor, and the sensor may be unable to detect the light spot).

Figure 3:
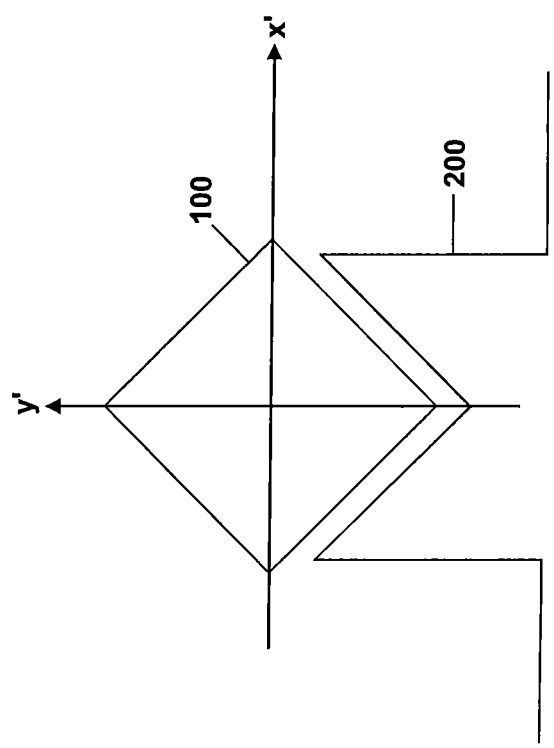
FIG. 3 shows an example of a position sensitive device arranged in another exemplary arrangement.

In FIG. 3 another exemplary orientation of the position sensitive device is shown. Compared to the example shown in FIG. 2, the device may be rotated by 45°. This rotation may enable the positioned sensitive device to be supported on an apex or corner of the position sensitive device as shown in FIG. 3. The position sensitive device may be supported by a support structure 200 in such a way that a rotation of a head in the horizontal plane (i.e., rotation of the position sensitive device about a vertical axis of the sensor in the horizontal plane) may result in a displacement of the light spot along one of the axes X', Y', whereas the nodding movement of the head (i.e., rotation of the position sensitive device about a horizontal axis of the sensor in a vertical plane) may result in a displacement of the light spot on the position sensitive device 100 along the other of the axes X' or Y'. Rotation of the head may cause the position sensitive device to rotate about the vertical axis of the position sensitive device in a substantially horizontal plane. Nodding of the head may cause the position sensitive device to rotate about the horizontal axis of the position sensitive device in a substantially vertical plane. Combined rotation and nodding of the head may cause the position sensitive device to rotate about the vertical axis and the horizontal axis of the position sensitive device. As can be deduced, when the axis X' is compared with axis x, a larger range of detection may be obtained so that greater head movements can be detected. For example, because a diagonal of a rectangular sensor 100 may have a greater length than the sides of the sensor, the axes X', Y' may have greater lengths than the corresponding axes x, y of the sensor 100' having substantially the same size and shape (but a different orientation) than the sensor 100.

Figure 8:
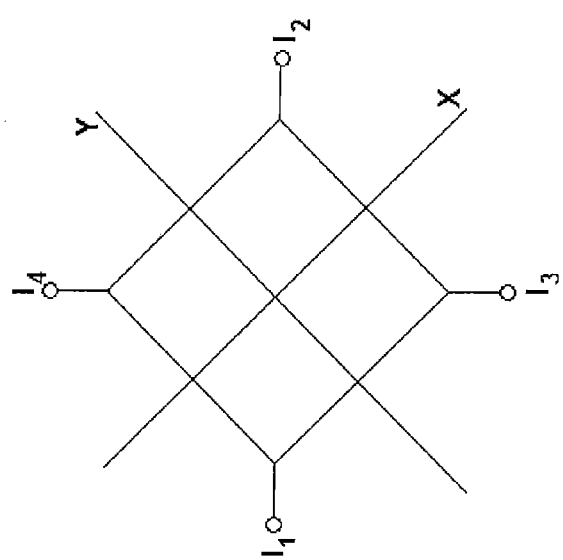
FIG. 8 shows an example of current outputs of a position sensitive device.

As described in connection with FIGS. 7-8 the output of the position sensitive device may be the currents $I_1$, $I_2$ for the one-dimensional case and $I_1$, $I_2$, $I_3$ and $I_4$ for the two-dimensional case. FIG. 8 shows one example of a two-dimensional position sensitive device. The currents $I_1$, $I_2$, $I_3$ and $I_4$ may be measured at points corresponding generally to the corners of the position sensitive device. The position of the light spot using a coordinate system as shown in FIG. 2 can be calculated as follows $$X = \frac{(I_2 + I_3) - (I_1 + I_4)}{I_1 + I_2 + I_3 + I_4} \cdot \frac{L}{2} \qquad (1)$$

$$Y = \frac{(I_2 + I_4) - (I_1 + I_3)}{I_1 + I_2 + I_3 + I_4} \cdot \frac{L}{2}. \qquad (2)$$

Using the system as shown in FIG. 3 with X' and Y', the transformation from X to X' and Y to Y' is as follows:

$$X' = (Y + X) \cdot \frac{\sqrt{2}}{2}. \qquad (3)$$

$$Y' = (Y - X) \cdot \frac{\sqrt{2}}{2}. \qquad (4)$$

Figure 4:
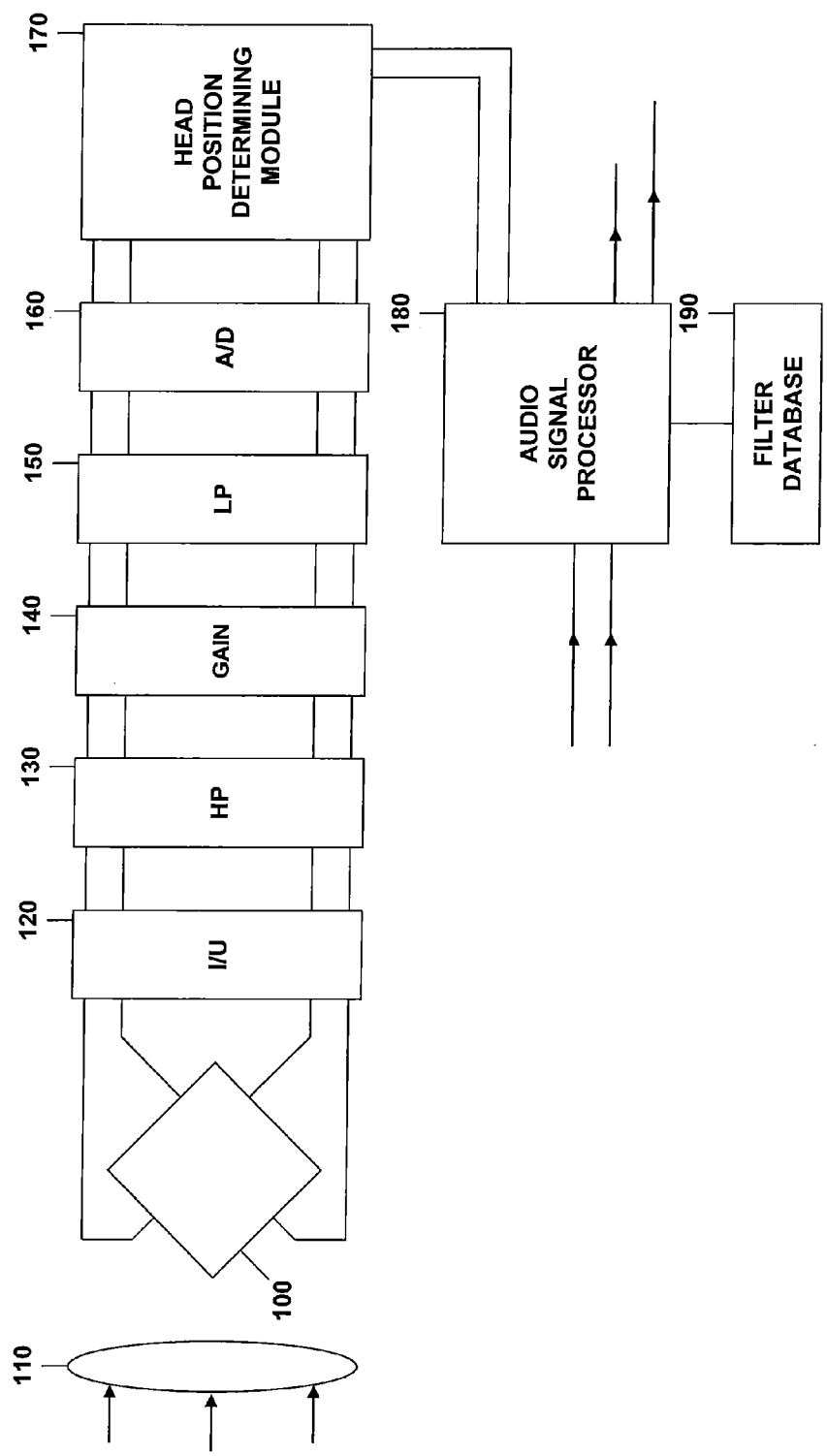
FIG. 4 shows a schematic view of an example of an audio system with a head tracking system for generating a virtual surround sound.

In connection with FIG. 4 it is explained in more detail how the head position is calculated. The head tracking system may be provided with a plurality of modules, units, and/or components. The head tracking system may include a computing device or computer, including for example software, hardware, or a combination of hardware and software capable of performing the described functionality. The head tracking system may be one or more separate systems or devices, may be one or more systems or devices included in another system, or may be combined with other systems or devices within the other system. The computing devices and modules of the head tracking system may be fully contained in the headphones. Alternatively, at least a part of the computing device(s) and/or modules of the head tracking system may be located external to the headphones, such as at the light source 10, in the audio system, or at some other location. In other examples, fewer or additional blocks may be used to illustrate the functionality of the head tracking system. The modules, units and/or components of the head tracking system may include a light source 10, a lens 110, a position sensitive device 100, headphones 20, a voltage converter 120, a high-pass filter 130, an amplifier 140, a low-pass filter 150, an analogue-to-digital converter 160, a head position determining module 170, an audio signal processor 180, and a filter database 190.

The functionality included in the head tracking system may be modules, components and/or units. The term "module" or "component" or "unit" may be defined to include one or more executable parts of a system. As described herein, the modules and/or units are defined to include software, hardware, or some combination thereof executable by a processor. The processor may be implemented as a single or as multiple microprocessors, as a digital signal processor (DSP), an application-specific integrated circuit (ASIC) or the like. Software included in the modules and/or units may include instructions stored in memory or a computer readable medium that are executable by the processor, or any other processor. Memory may include all types of memory, such as random access memory, flash memory, a hard drive, a CD-ROM device, a DVD device, a ROM memory device, or any other non-transitory data storage device. In addition, rewritable non-volatile memory, such as flash memory, may be provided to store processing information in a flexible way and to maintain the stored information even in the case of a power outage. Hardware included in the modules and/or units may include various devices, components, circuits, gates, circuit boards, and the like that are executable, directed, and/or controlled for performance by the processor.

The light source 10 shown in FIG. 1, and not shown in FIG. 4, may emit light in an infrared spectrum. Furthermore, a modulation circuit for modulating the light emitted by the LED according to a predetermined pattern may be provided modulating the emitted light. With such a modulation a light emitted from the LED may be discerned from light emitted from other sources. The light may pass through a lens 110 to focus the light on the position sensitive device 100. In front of the lens 110 an optical filter may be provided for filtering the received light. The filter may be a filter which is transparent to infrared light, but opaque for light of other wavelengths, such as visible light.

The position sensitive device 100 may be placed in the focal plane of lens 110 where the light is focused in a light spot. The device 100 may be installed on the headphones and, depending on the position of the head, the light of the fixedly installed light source may be focused on the surface of the position sensitive device to form a light spot.

As was explained above in connection with FIG. 8, four currents I1 to I4 may be generated. These four currents may be fed to a current voltage converter 120 which converts the current into voltages. This, for example, may be achieved by measuring the voltage drop of a resistor having a known resistance through which the respective current flows. The thus generated voltages may then be filtered using at least one high-pass filter 130 in order to filter out DC components and other low frequency components. After the high-pass filter 130 the high-passed filtered voltages may be amplified in amplifier 140 before being low-pass filtered in at least one low-pass filter 150. The low-pass filter together with the high-pass filter may build a band-pass filter transmitting only the signals originating from the modulated pulsed infrared light source. In other examples, other forms of band-pass filter may be used.

The signal may then be passed through an analogue-to-digital converter 160, where the signal is generated in the digital domain. From the converter 160 the signal may be fed to a head position determining module where the azimuth angle and the elevation angle of the head are determined. The head position determining module may include a conversion unit where the currents (or the corresponding voltages) are converted into X', Y' location describing the position of the light spot in the X', Y' system. This position may then be converted into the azimuth angle (yaw) and elevation angle in case of a nodding movement (pitch). The head position determining module may be a processor or other module or unit configured to determine the azimuth and/or elevation angles based on the position of the light spot on the position sensitive device.

For a generation of the virtual surround sound it may be sufficient to only determine the yaw, as this head rotation mainly influences the signal path from the virtual sound source to the left and right ear. The yaw angle may be the most important angle as a change of the yaw angle may have the largest influence on the interaural time difference (ITD) and interaural level difference (ILD) which are used for the aural localization perception by the user. Thus, the head position determining module may output one or two angles, either the yaw angle alone or the yaw and pitch angle. The conversion of the position X', Y' into angles may be obtained by using the arctangent. For example, the lateral deviation of the light spot on the opposition sensitive device may be determined as described above. The distance between the lens 110 and the device 100 may be known. The azimuth angle (yaw) may be determined as the arctangent of the lateral deviation of the light spot along one of the X' and Y' axes divided by the distance between the lens 110 and the device 100. Similarly, the elevation angle (pitch) may be determined as the arctangent of the lateral deviation of the light spot along the other of the X' and Y' axes divided by the distance between the lens 110 and the device 100. In one example, a table also may be provided in which the correspondence between different positions X', Y' and different corresponding angles are stored. The head position determining module may be configured to correlate the position of the light spot on the position sensitive device with the corresponding angles stored in the table. In other examples, correspondence between different positions X', Y' and different corresponding angles may be calculated by the processor and the light spot position correlated. The angles (yaw, pitch) or the angle (yaw) can be determined, e.g., by the head position determining module, and transmitted to the processor illustrated as an audio signal processor 180.

The yaw and/or pitch angles may be determined based on the position of the light spot on the position sensitive device. Such a determination may be made without the use of additional sensors such as, for example, a gyroscope or tilt sensor. The determination also may be relatively fast as compared to using multiple or additional sensors. For example, the calculation of the yaw and/or pitch angles based on the position of the light spot may be relatively simple and thus may be completed quickly with little source code. In some instances, it may be desirable to synchronize the generated audio signal with a corresponding video signal, such as when viewing a film using a rear seat vehicle entertainment system. In these or other situations, the speed of the calculation may be an important consideration in generating the real time audio signal.

The audio signal processor may receive an input, e.g. a stereo audio input signal. With the determined angle or the determined angles, the audio signal processor may access a filter database 190 where the corresponding filters are stored for the different angles. As discussed in connection with FIGS. 5 and 6 the filter database may be determined in advance using the dummy head. For each head position, a filter pair for the left and right audio signals may be retrieved and the audio input signal may be filtered using the filter elements for that determined head position. Alternatively, or in addition, the filters may be dynamically generated or coefficients of the filters may be adjusted by the processor using the audio signal processor based on the determined head position. The audio output signal may be generated by a convolution of the audio input signal with the filters from the filter database 190 and then fed to the headphones.

Figure 9:
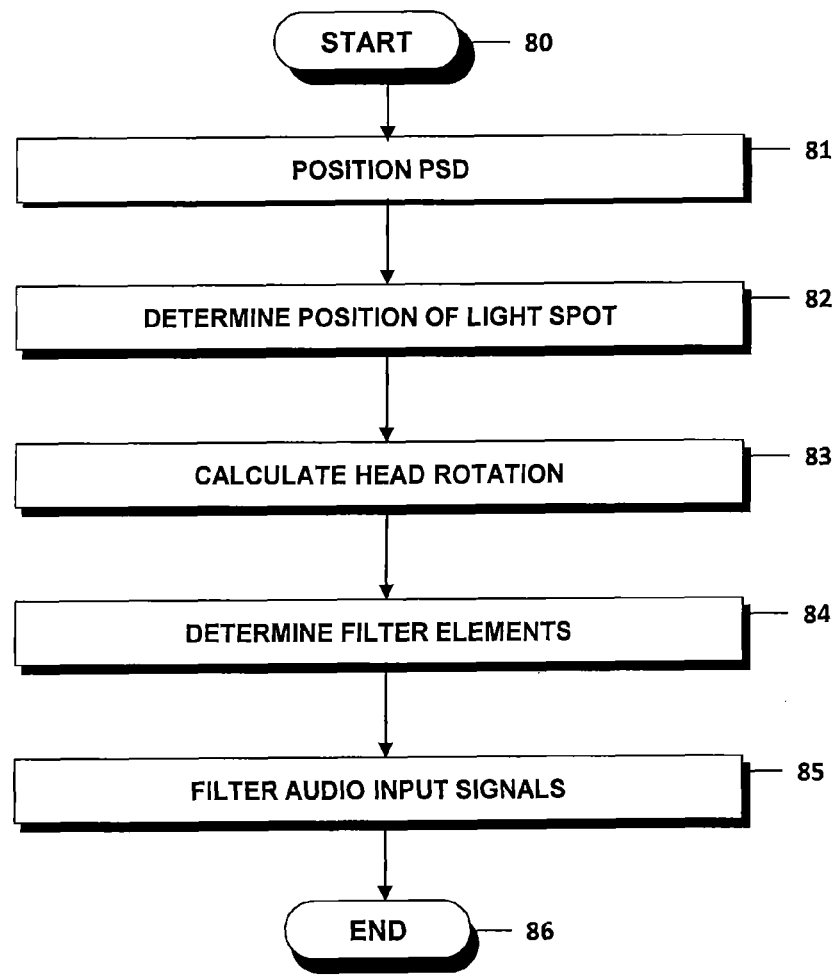
FIG. 9 shows a flow chart describing exemplary steps for generating a virtual surround sound for a user.

In FIG. 9 the different steps carried out for determining the virtual surround sound for the user wearing headphones are summarized. The method starts in step 80. In step 81 the position sensitive device, PSD, may be positioned on the headphones as shown in FIG. 1 and shown in further detail in FIG. 3. The light emitted by the light source may generate a light spot on the position sensitive device. In step 82, the position of the light spot may be determined using the currents I1 to I4 as explained in connection with FIG. 7. When the position of the light spot in the x', y' coordinate system is known, the head rotation can be calculated in step 83. Here, either the azimuth angle or the azimuth angle and the elevation angle of the user's head may be determined. With the known head position in step 84 the corresponding filter elements from the filter database 190 may be determined and/or retrieved, and in step 85 the audio input signal may be filtered in the audio signal processor 180 to generate the virtual surround sound for the user. The method ends in step 86.

At least a portion of the method may be repeated to adjust the virtual surround sound signal. For example, the system may return to step 82 to determine a second position of the light spot on the position sensitive device. A second head rotation (e.g., a second azimuth angle and/or a second pitch angle) may be determined based on the second position of the light spot in step 83. A second set of corresponding filter elements may be determined and/or retrieved from the filter database based on the determined second head rotation in step 84. In step 85, the audio signal may be filtered using the second set of filter elements, and a second virtual surround sound signal may be generated (e.g., the virtual surround sound signal may be adjusted according to the second head rotation).

The head tracking system may enable determination of a head position in a range of approximately +/−45° using a single position sensitive device. Accordingly, a gyroscope, a compass and/or an accelerometer may be unnecessary for determining the head position. Thus, the number of sensors can be greatly reduced by using only one position sensitive device, such as device 100, that is oriented as shown in FIGS. 3 and 4 for an improved detection range.

While various examples of the invention have been described, it will be apparent to those of ordinary skill in the art that many more examples and implementations are possible within the scope of the invention. Accordingly, the invention is not to be restricted except in light of the attached claims and their equivalents.

We claim:

1. A head tracking system for determining a head position of a user, the system comprising:
a light source positioned at a fixed point;
a planar rectangular position sensitive device supported by a support structure, the light source configured to generate a light spot on the position sensitive device the support structure and the planar rectangular position sensitive device being movable with respect to the fixed point; and
a head position determining module configured to determine the head position based on a position of the light spot on the position sensitive device;
two headphones fixedly coupled to the support structure;
where a diagonal between a pair of opposing corners of the position sensitive device is oriented parallel to a line connecting the two headphones.

2. The head tracking system according to claim 1, where the position sensitive device is a square position sensitive device.

3. The head tracking system according to claim 1, where the support structure supports the position sensitive device on an apex of the position sensitive device.

4. The head tracking system according to claim 1, where the head position determining module is configured to determine a yaw angle.

5. The head tracking system according to claim 1, where the pair of opposing corners is a first pair of opposing corners and the diagonal is a first diagonal, a second diagonal between a second pair of opposing corners of the position sensitive device is oriented orthogonal to the line connecting the two headphones, where the head position determining module is configured to determine a yaw angle based on the position of the light spot relative to the first diagonal, and the head position determining module is configured to determine a pitch angle based on the position of the light spot relative to the second diagonal.

6. The head tracking system according to claim 1, where the head position determining module is configured to determine a position of the light spot relative to the diagonal of the position sensitive device and retrieve a yaw angle corresponding to the position of the light spot relative to the diagonal.

7. The head tracking system according to claim 1, where the determined head position is independent of an intensity of the light spot on the position sensitive device.

8. A system for generating a virtual sound signal, the system comprising:
a light source positioned at a fixed point;
a planar rectangular position sensitive device supported by a support structure, the light source configured to generate a light spot on the position sensitive device, the support structure and the planar rectangular position sensing device being movable with respect to the fixed point;
a head position determining module configured to determine a head position based on a position of the light spot on the position sensitive device;
two headphones fixedly connected to the support structure;

a filter database comprising a plurality of filter elements, each filter element corresponding to a defined head position; and an audio signal processing module configured to receive an audio input signal, select at least one of the plurality of filter elements corresponding to the determined head position, filter the received audio input signal with the selected at least one filter element, and generate the virtual surround sound signal, where a diagonal between a pair of opposing corners of the position sensitive device is oriented parallel to a line connecting the two headphones.

9. The system according to claim 8, where the head position determining module is configured to calculate a yaw angle based on the position of the light spot on the position sensitive device.

10. The system according to claim 8, where the head position determining module is configured to determine a position of the light spot relative to the diagonal of the position sensitive device and retrieve a yaw angle corresponding to the position of the light spot.

11. The system according to claim 8, where each of the plurality of filter elements corresponds to an impulse response determined for the corresponding defined head position.

12. The system according to claim 8, where the head position is a first head position and the position of the light spot on the position sensitive device is a first position of the light spot on the position sensitive device, the head position determining module further configured to determine a second head position based on a second position of the light spot on the position sensitive device.

13. The system according to claim 12, where the selected at least one filter element is a first at least one filter element corresponding to the first head position, the audio signal processing module further configured to select a second at least one filter element corresponding to the second head position, filter the received audio input signal with the second at least one filter element, and adjust the virtual surround sound signal.

14. A method for determining a head position of a user, the method comprising the steps of:

emitting light with a light source toward a rectangular planar position sensitive device supported by a support structure;

generating a light spot on the position sensitive device with the emitted light;

orientating the position sensitive device such that a diagonal between a pair of opposing corners of the position sensitive device is in parallel to a line crossing two headphones fixedly connected to the support structure;

sensing a rotation of the position sensitive device based on a displacement of the light spot towards one of the pair of opposing corners of the position sensitive device; and determining the head position based on a position of the light spot on the position sensitive device.

15. The method according to claim 14, where the position sensitive device is a square position sensitive device and sensing the rotation of the position sensitive device comprises sensing the displacement of the light spot on the diagonal of the square position sensitive device.

16. The method according to claim 14, where determining the head position comprises calculating a yaw angle.

17. The method according to claim 14, where determining the head position comprises determining a position of the light spot relative to the diagonal of the position sensitive device and retrieving a yaw angle corresponding to the position of the light spot relative to the diagonal.

18. The method according to claim 14, where the determined head position is independent of an intensity of the light spot on the position sensitive device.

19. A method for generating a virtual surround sound signal, the method comprising the steps of:

emitting light with a light source toward a rectangular planar position sensitive device supported by a support structure;

generating a light spot on the position sensitive device with the emitted light;

orientating a position sensitive device such that a diagonal between a pair of opposing corners of the position sensitive device is in parallel to a line crossing two headphones fixedly connected to the support structure;

sensing a rotation of the position sensitive device based on a displacement of the light spot towards one of the pair of opposing corners of the position sensitive device;

determining a head position based on a position of the light spot on the position sensitive device;

determining a filter element corresponding to the determined head position;

receiving an audio input signal; and filtering the audio input signal with the determined filter element to generate the virtual surround sound signal.

20. The method according to claim 19, where determining the head position comprises calculating a yaw angle based on the position of the light spot on the position sensitive device.

21. The method according to claim 19, where determining the head position comprises determining a position of the light spot relative to the diagonal of the position sensitive device and retrieving a yaw angle corresponding to the position of the light spot.

22. The method according to claim 19, where determining a filter element comprises determining an impulse response corresponding to the determined head position.

23. The method according to claim 19, where the head position is a first head position and the position of the light spot on the position sensitive device is a first position of the light spot on the position sensitive device, the method further comprising determining a second head position based on a second position of the light spot on the position sensitive device.

24. The method according to claim 23, where the determined filter element is a first filter element corresponding to the first head position, the method further comprising determining a second filter element corresponding to the second head position, filtering the received audio input signal with the second filter element, and adjusting the virtual surround sound signal.

* * * * *